United States Patent
Cai et al.

(10) Patent No.: US 6,219,474 B1
(45) Date of Patent: Apr. 17, 2001

(54) CONFIGURABLE OPTICAL ADD/DROP DEVICE

(75) Inventors: Bo Cai, San Jose; Xing Ma, Sunnyvale; Gang Lei; Jyehong Chen, both of San Jose, all of CA (US)

(73) Assignee: E-Tek Dynamics, San Jose, CA (US)

( * ) Notice: Subject to any disclaimer, the term of this patent is extended or adjusted under 35 U.S.C. 154(b) by 0 days.

(21) Appl. No.: 09/275,511

(22) Filed: Mar. 24, 1999

(51) Int. Cl.⁷ .................................................. G02B 6/293
(52) U.S. Cl. ................................ 385/24; 385/21; 359/128
(58) Field of Search .............................. 385/15–18, 20, 385/21, 24, 31, 39; 359/124, 127, 128

(56) References Cited

U.S. PATENT DOCUMENTS

| | | | |
|---|---|---|---|
| 5,488,500 | 1/1996 | Glance | 359/127 |
| 5,612,805 * | 3/1997 | Fevrier et al. | 359/124 |
| 5,712,717 | 1/1998 | Hamel et al. | 359/130 |
| 5,712,932 * | 1/1998 | Alexander et al. | 385/24 |
| 5,748,811 * | 5/1998 | Amersfoort et al. | 385/15 |
| 5,771,112 * | 6/1998 | Hamel et al. | 359/128 |
| 5,778,118 | 7/1998 | Sridhar | 385/24 |
| 5,822,095 | 10/1998 | Taga et al. | 359/127 |
| 5,915,051 | 6/1999 | Damask et al. | 385/16 |
| 5,940,197 * | 8/1999 | Ryu | 359/127 X |
| 5,974,207 * | 10/1999 | Aksyuk et al. | 385/24 |
| 6,002,503 | 12/1999 | Mizrahi | 359/124 |
| 6,035,080 * | 3/2000 | Henry et al. | 385/24 |
| 6,038,045 * | 3/2000 | Sotom et al. | 359/128 |
| 6,061,157 * | 5/2000 | Terahara | 359/124 |
| 6,061,484 | 5/2000 | Jones et al. | 385/24 |
| 6,069,719 * | 5/2000 | Mizrahi | 359/124 |
| 6,084,694 * | 7/2000 | Milton et al. | 359/124 |

* cited by examiner

*Primary Examiner*—John D. Lee
(74) *Attorney, Agent, or Firm*—Blakeley, Sokoloff, Taylor & Zafman LLP

(57) ABSTRACT

An add/drop device is described that allows channels from a multi-channel optical path to be dropped to a device and a new or modified channel to be added to the multi-channel optical path. The device thereby has access to a channel from the multi-channel optical path without having access to all of the channels. In one embodiment, the add/drop device of the invention includes one or more intermediate ports and a switch. The intermediate ports communicate the channels not dropped by the add/drop device and the switch selectively optically couples the dropped channel either to the device or to be added back into the multi-channel path. The switch also selectively optically couples the new or modified channel to be added to the multi-channel path. The one or more intermediate ports allow multiple add/drop devices to be optically coupled together to provide a configurable add/drop mechanism. The configurable add/drop mechanism allows channels from the multi-channel optical path to be provided to devices without the need of physically adding or removing an add/drop device from the multi-channel optical path.

13 Claims, 10 Drawing Sheets

CONFIGURABLE OPTICAL ADD/DROP DEVICE

FIELD OF THE INVENTION

The invention relates to optical devices. More particularly, the invention relates to add/drop devices for optical communications networks.

BACKGROUND OF THE INVENTION

Fiber optic networks have the ability to communicate multiple channels of information on a single fiber. The ability to communicate multiple channels with a single fiber increases the bandwidth of networks and other devices including fiber optic networks as compared to communication channels that are limited to a single channel. Because each fiber can carry multiple channels, routing of channels is more complex than if each fiber carries a single channel.

One routing scheme is to route each channel to each device and allow the devices to access the appropriate information. FIG. 1 is a block diagram of a simple network with each device having access to each channel of information. Network 100 includes devices 110, 130 and 160 that are connected by fiber optic communications paths. Paths 120 and 125 communicate information between device 110 and device 130. Similarly, paths 140 and 145 communicate information between device 130 and 160, and paths 150 and 155 communicate information between device 110 and device 160.

However, for networks having many devices, an interconnection between each device can be prohibitively expensive, or even physically impossible. In order to provide interconnection of many devices to a fiber optic network, add/drop devices have been developed.

FIG. 2 illustrates an add/drop device. Communications path 200 is a multi-channel fiber optic path that is optically coupled to drop filter 210. Drop filter 210 filters a channel by passing the channel to communications path 220 and reflecting the remaining channels to communications path 230. The channels passed to communications path 220 are delivered to device 240 that operates on the received channel.

Device 240 generates information that is communicated via path 250 to add filter 260. Add filter 260 reflects the channels of path 230 and adds the channel of path 250 to provide a combination of channels to path 270. In this manner device 240 is allowed to access to data on a channel without requiring access to all available channels.

However, the configuration of FIG. 2 is static and must be determined at the time of network configuration. Adding and dropping additional channels requires physical addition of additional add and drop filters as well as splicing into multi-channel paths 200 and 270. What is needed is an improved add/drop device.

SUMMARY OF THE INVENTION

An optical add/drop device is described. The add/drop device has an input port to receive multiple channels of information. A drop filter is optically coupled to the input port. The drop filter passes a channel or a group of channels and reflects the remaining channels to a first intermediate port. An add filter is optically coupled to a second intermediate port. The add filter combines the added channel or group of channels and reflects the remaining channels to an output port. A switch is optically coupled to the drop filter, to the add filter, to an add port and to a drop port. The switch selectively optically couples the drop filter to the drop port and the add port to the add filter when in a first state. The switch selectively optically couples the drop filter to the add filter and the add port to the drop port when in a second state. The basic add/drop function can be realized by optically linking the first and second intermediate ports. In one embodiment, the switch includes a diffraction prism to selectively optically couple the ports. In an alternative embodiment, the switch includes a mirror to selectively optically couple the ports of the add/drop device.

In one embodiment, multiple add/drop devices are interconnected to allow multiple channels or groups of channels to be dropped and added. The input ports, output ports, first intermediate ports, and second intermediate ports of the multiple add/drop devices are interconnected to allow dropping and adding of multiple channels.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION

An optical add/drop device is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The invention allows channels from a multi-channel optical path to be dropped to a device and a new or modified channel to be added to the multi-channel optical path. The device thereby has access to a channel from the multi-channel optical path without having access to all of the channels. In one embodiment, the add/drop device of the invention includes one or more intermediate ports and a switch. The intermediate ports communicate the channels not dropped by the add/drop device and the switch selectively optically couples the dropped channel either to the device or to be added back into the multi-channel path. The switch also selectively optically couples the new or modified channel to be added to the multi-channel path.

The one or more intermediate ports allow multiple add/drop devices to be optically coupled together to provide a configurable add/drop mechanism. The configurable add/drop mechanism allows channels from the multi-channel optical path to be provided to devices without the need of physically adding or removing an add/drop device from the multi-channel optical path.

Figure 1:
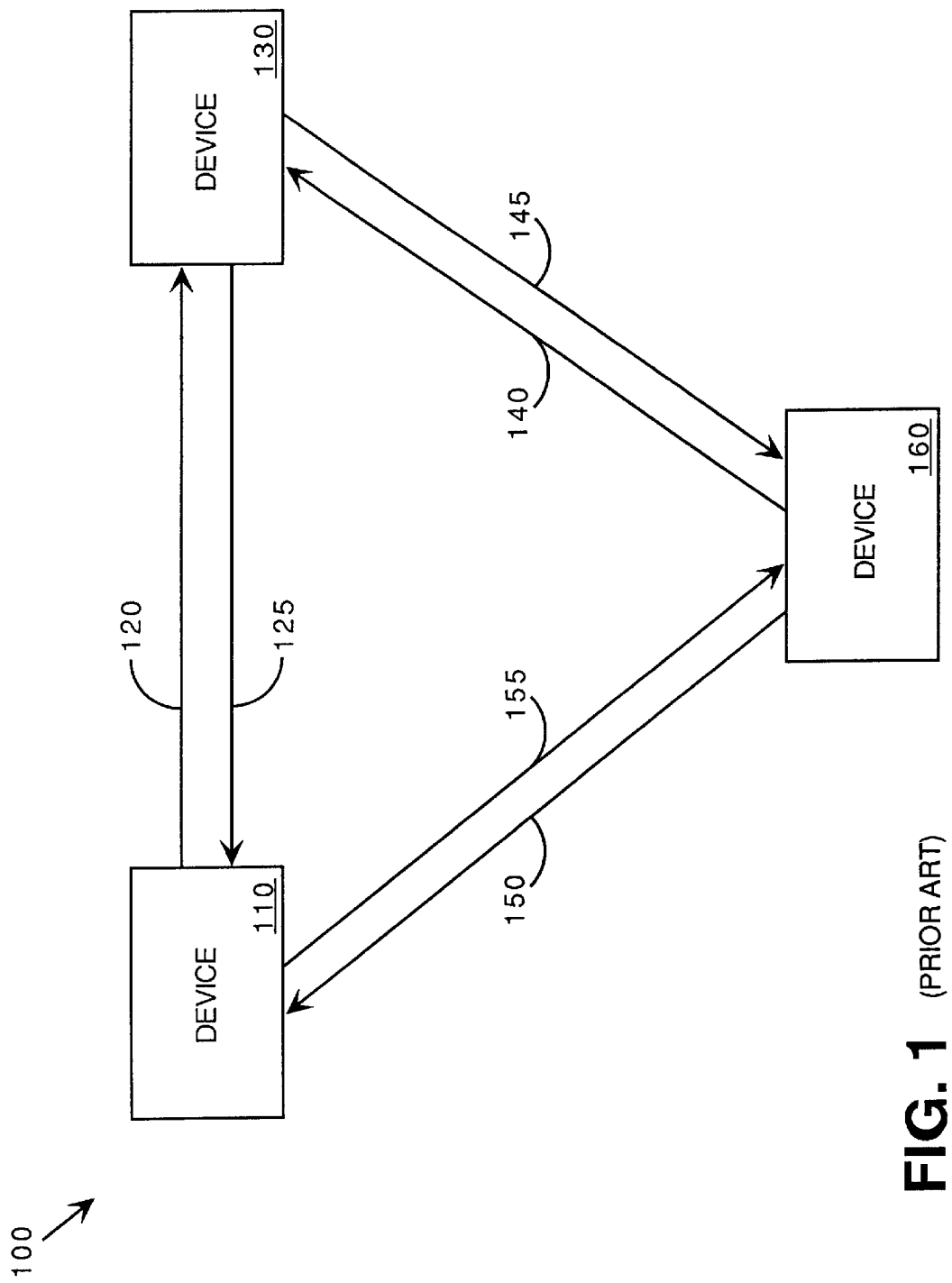
FIG. 1 is a block diagram of a simple network with each device having access to each channel of information.
Figure 2:
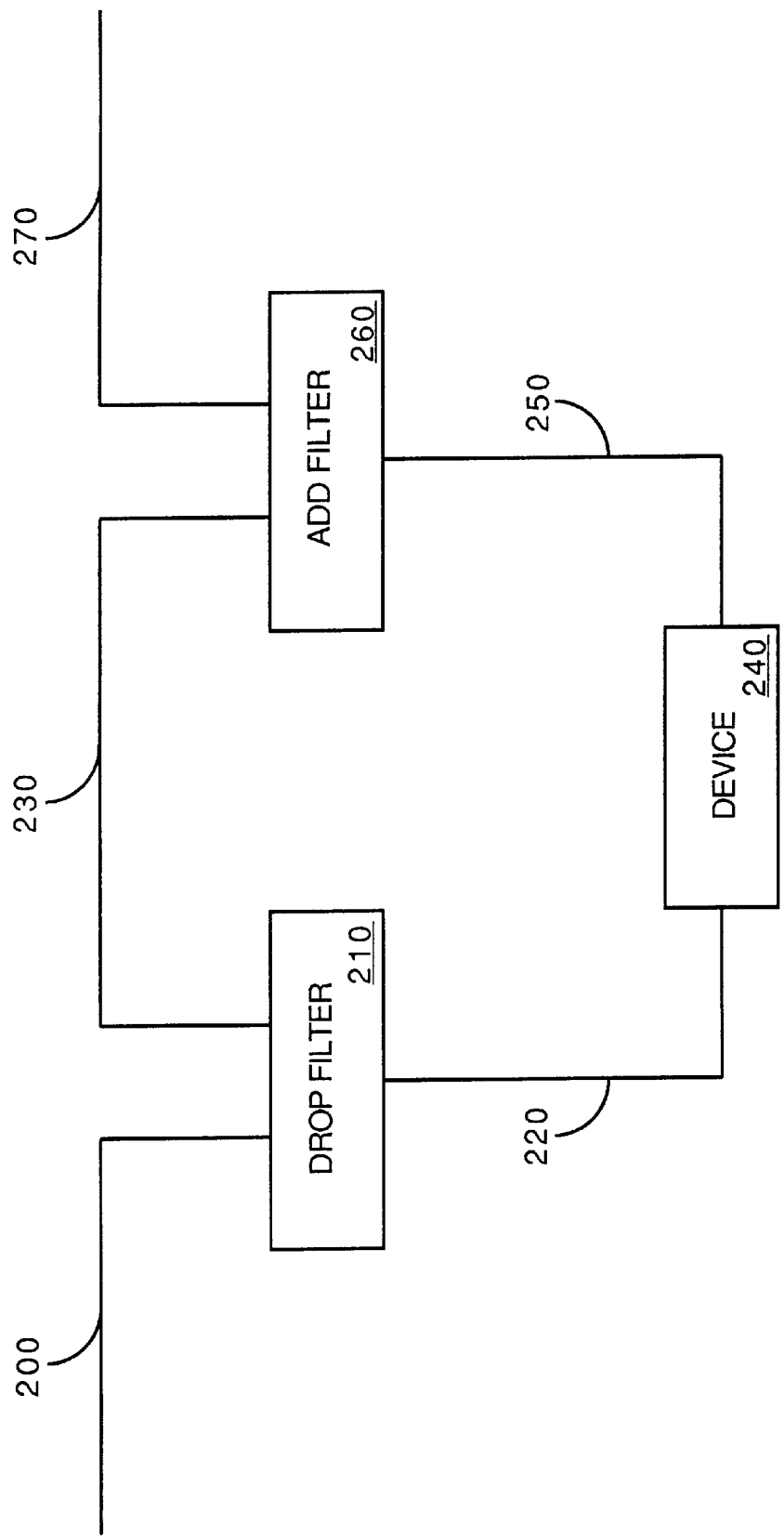
FIG. 2 illustrates an add/drop device.
Figure 3:
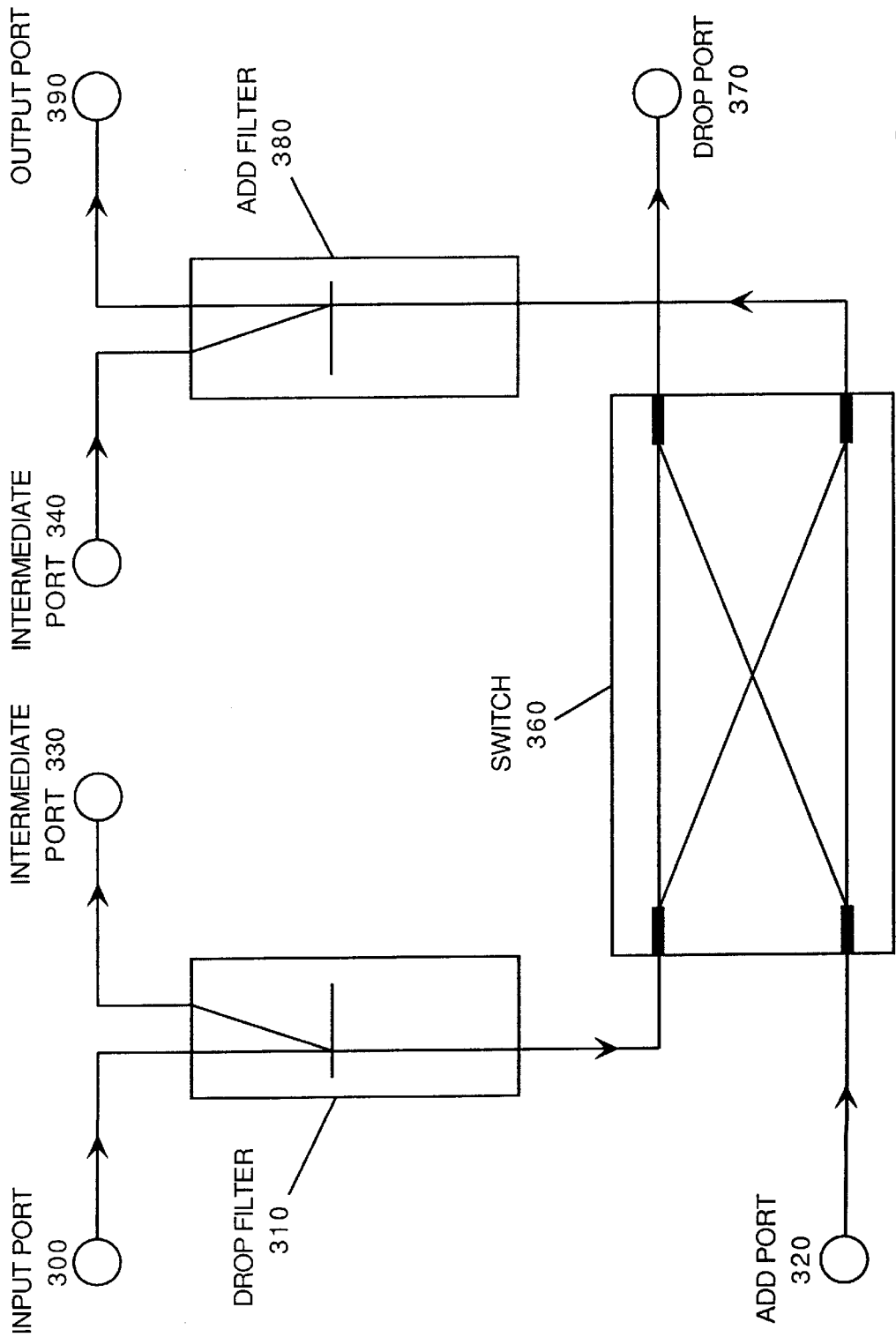
FIG. 3 is an add/drop device according to one embodiment of the invention.

FIG. 3 is one embodiment of an add/drop device according to one embodiment of the invention. Input port 300 is configured to receive a multiple channel optical communications device, for example, collimator optically coupled to a fiber that communicates multiplexed information corresponding to multiple channels.

Input port 300 is optically coupled to drop filter 310. Drop filter 310 is configured to pass a channel received from input port 300. The remaining channels are reflected to intermediate port 330, which is also optically coupled to drop filter 310. The channel passed (or dropped) by drop filter 310 is input to a first input port of switch 360. In one embodiment, switch 360 is a 2×2 optical switch. Various embodiments for switch 360 are described in greater detail below. Other switching configurations can also be used.

Add port 320 provides an input signal to a second port of switch 360. Add port 320 is optically coupled to a device (not shown in FIG. 3) that can receive data from and provide data to switch 360. Drop port 370 is a first output port of switch 360 and is optically coupled to the device. The second output port of switch 360 is optically coupled to add filter 380.

In one embodiment add filter 380 provides the same filtering functionality as drop filter 310. Thus, add filter 380 passes the channel provided by switch 360 and reflects the channels provided from intermediate port 340. In this manner, add filter 380 adds a channel corresponding to the dropped channel to the multiple channels received by intermediate port 340. Output port 390 receives both the channels from intermediate port 340 that are reflected by add filter 380 and the channel passed by add port 320 that adds the channel to the multiple channels from intermediate port 340.

The following example assumes five input channels; however, any number of channels can be supported. Input port 300 receives five channels (channels 1, 2, 3, 4 and 5), one of which (channel 3) is to be communicated to a device optically coupled to add port 320 and drop port 370. Drop filter 310 passes channel 3 to switch 360 and reflects channels 1, 2, 4 and 5 to intermediate port 330. Drop filter 310 can be configured in any manner known in the art. As described in greater detail below, intermediate port 330 and intermediate port 340 can be used to interconnect multiple add/drop devices together. If a single add/drop device is used, intermediate port 330 is optically coupled to intermediate port 340 (not shown in FIG. 3).

Switch 360 steers channel 3 to either drop port 370 or to add filter 380. In one embodiment, if switch 360 is in the cross state channel 3 is looped to add filter 380 and added to the channels from intermediate port 340. If switch 360 is in the bar state, channel 3 is communicated to drop port 370. A device, for example, a computer system, is optically coupled to drop port 370 to receive channel 3. The device provides a new channel 3 to add port 320.

Add port 320 is optically coupled to add filter 380 when switch 360 is in the bar state. Add filter 380 passes the new channel 3 to output port 390. The channels provided by intermediate port 340 are reflected by add filter 380 to output port 390. When switch 360 is in the cross state, the new channel 3 from add port 320 is optically coupled to drop port 370. Switch 360 can also be configured to communicate channel 3 to the device in the cross state and to add channel 3 back in the bar state.

Thus, the add/drop device of FIG. 3 receives channels 1, 2, 3, 4 and 5 at input port 300. If configured in a first state the add/drop device receives channels 1, 2, 3, 4 and 5 and outputs channels 1, 2, 3', 4 and 5, where 3' is a new channel generated by a device optically coupled to the add/drop device of FIG. 3. If configured in a second state, the add/drop device receives channels 1, 2, 3, 4 and 5, and outputs channels 1, 2, 3, 4 and 5.

Figure 4:
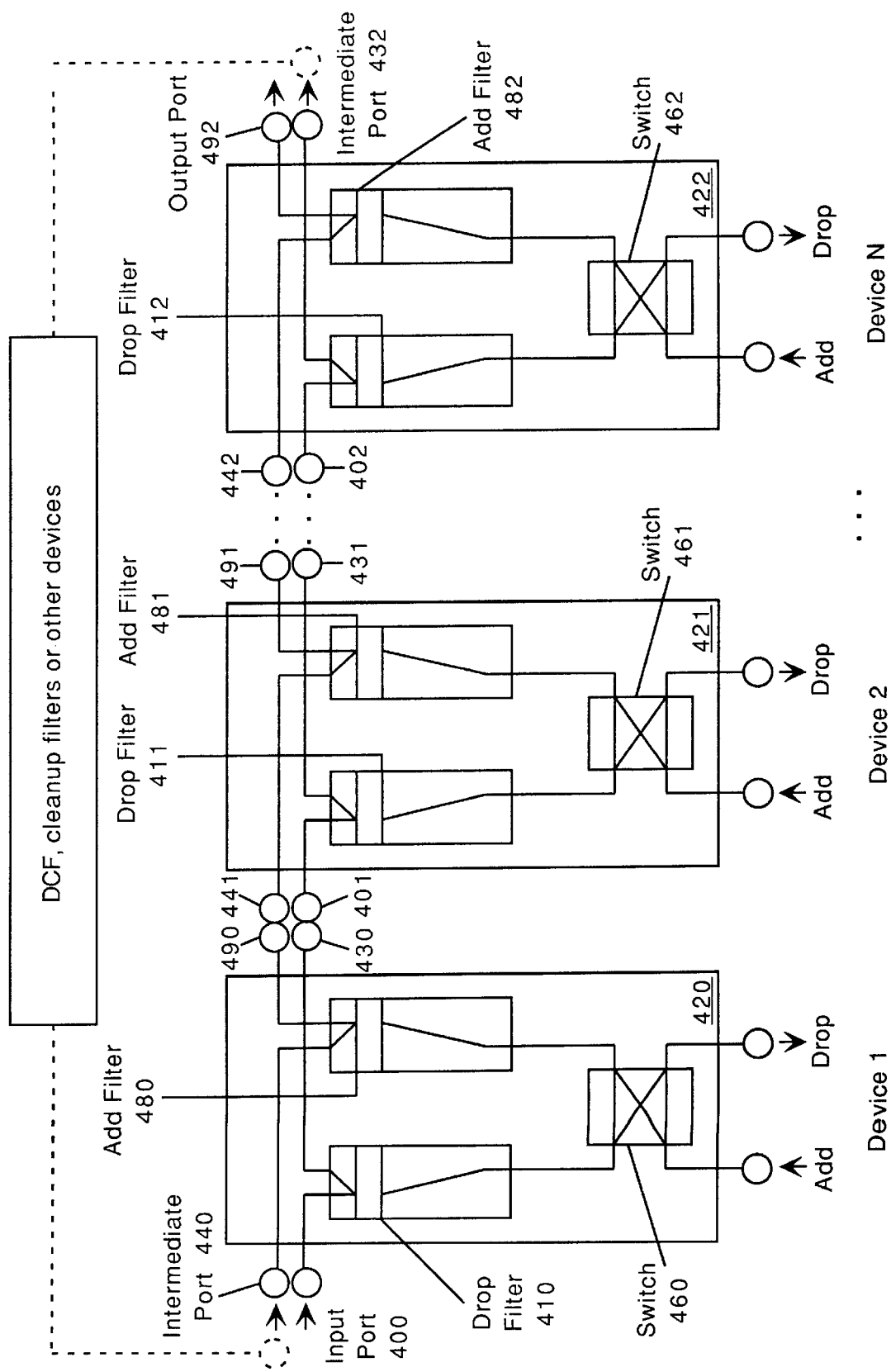
FIG. 4 illustrates multiple interconnected add/drop devices according to one embodiment of the invention.

FIG. 4 is one embodiment of multiple interconnected add/drop devices according to one embodiment of the invention. Because each add/drop device of FIG. 4 includes two intermediate ports, multiple add/drop devices can be connected to a fiber optic line to allow reconfiguration of individual channel access by configuring switches rather than physically inserting or removing an add/drop device.

For example, if an optical line communicates N channels, N add/drop devices can be built into a fiber optic network and the switches of the respective add/drop device can be set at cross or bar depending on whether access to the corresponding channel is desired. Thus, granting or denying access to channels is simplified as compared to inserting or removing an add/drop device to change access to a channel. Of course, more or fewer than N add/drop devices can be used to provide access to channels communicated by the optical line.

In one embodiment, each add/drop device (420, 421 and 422) operates in the manner described above with respect to the add/drop device of FIG. 3. Interconnection of multiple add/drop devices as shown in FIG. 4 provides a configurable add/drop mechanism that allows modification of access to one or more channels of a multi-channel optical line without physical insertion or removal of hardware. Alternative embodiments of add/drop devices are described in greater detail below and can also be used to provide a configurable add/drop mechanism.

Input port 400 of add/drop device 420 is optically coupled to receive a multi-channel optical communications device, for example, an optical fiber. Drop filter 410 passes a channel and reflects the remaining channels to intermediate port 430. As described in greater detail below, drop filter 410 can comprise multiple filters. Switch 460 causes the channel to be passed to Device 1 or to be passed to add filter 480. Add filter 480 receives either the channel dropped by drop filter 410 or a channel generated by Device 1. The channel received by add filter 480 is added to the channel(s) received by intermediate port 440.

Output port 490 of add/drop device 420 is optically coupled to intermediate port 441 of add/drop device 421. Intermediate port 430 of add/drop device 420 is optically coupled to input port 401 of add/drop device 421. Drop filter 411 operates to drop a channel to switch 461 and reflect the remaining channels to intermediate port 431. Switch 461 operates in a similar manner to switch 460. Add filter 481 adds the channel received to generate an output to output port 491.

Multiple add/drop devices are interconnected in a similar manner up to add/drop device 422, which is optically coupled to Device N. Any number of add/drop devices can be optically coupled together. Input port 402 and intermediate port 442 are optically coupled to an intermediate port and output port, respectively, of another add/drop device (not shown in FIG. 4). Drop filter 412 operates to drop a channel to switch 462 that either optically couples the output of drop filter 412 to Device N or to add filter 482. Add filter 482 adds the channel received to the channels received via intermediate port 442 to generate an output at output port 492.

In one embodiment, intermediate port 432 of add/drop device 422 is optically coupled to intermediate port 440 of add/drop device 420. The coupling can be either direct or through other devices, for example, dispersion management, cleanup filters or other devices.

Figure 5:
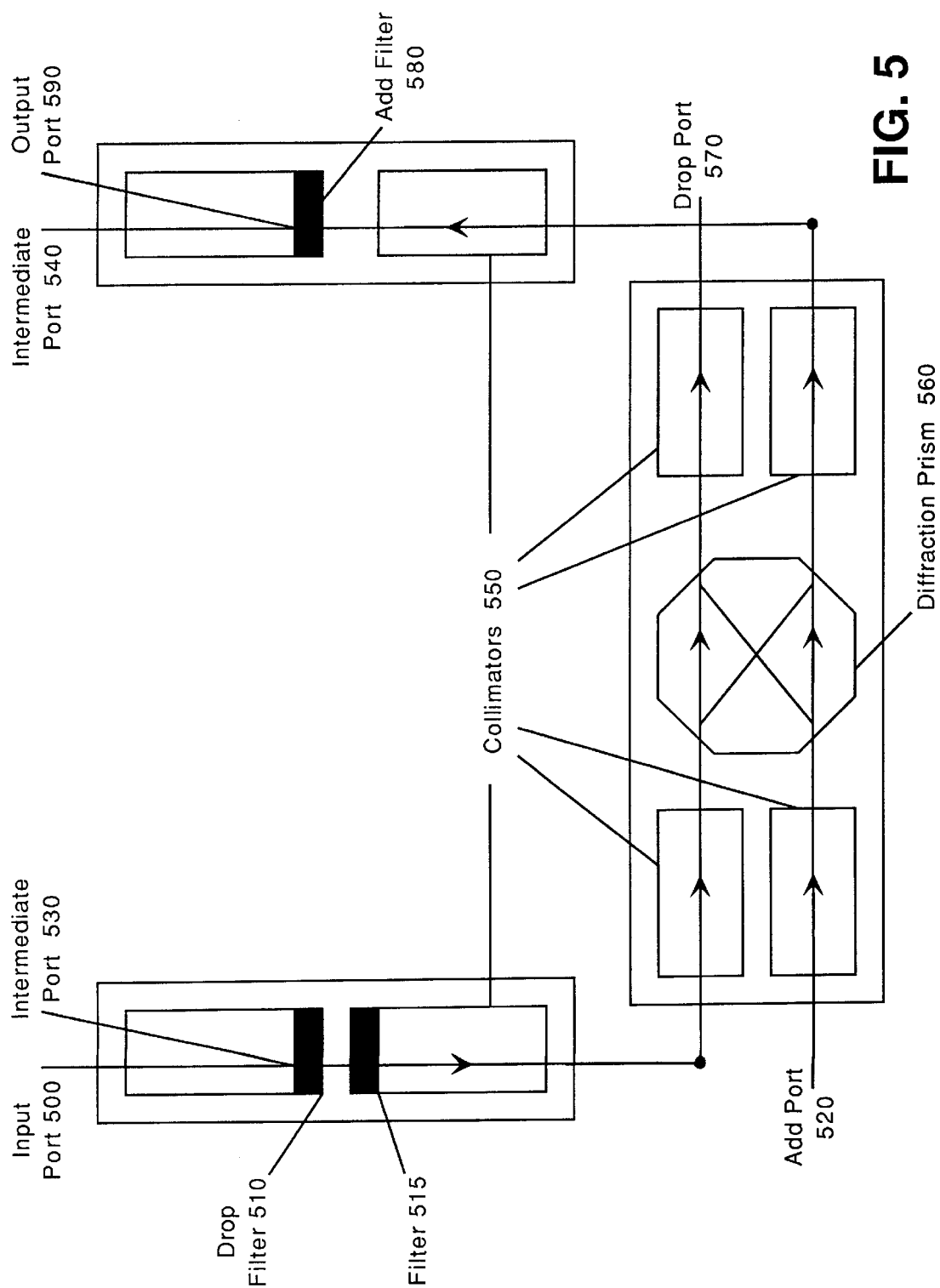
FIG. 5 is a configurable add/drop device having a prism switch according to the one embodiment of the invention built with discrete optical components.

FIG. 5 is an add/drop device having a prism switch according to the one embodiment of the invention built with discrete optical components. Input port 500 and intermediate port 530 are optically coupled to drop filter 510. As described in greater detail above, drop filter 510 drops a channel from multiple channels received via input port 500.

Filter 515 provides further filtering of the signal passed by drop filter 510. In one embodiment filter 515 has the same filtering properties as drop filter 510. For example, if drop filter 510 is used to drop channel 3 of five incoming channels, in general, channel 3 is passed and the remaining channels are reflected. However, because physical filters are not ideal, some light representing the remaining channels may also be passed by drop filter 510. To minimize the unwanted light (or increase isolation to other channels), filter 515 is provided to double the isolation provided. For example, if 2% unwanted light passes drop filter 510, 0.04% passes both drop filter 510 and filter 515. While filter 515 is not necessary to practice the invention, addition of filter 515 can provide better performance than an embodiment with a single drop filter.

In one embodiment, collimators 550 optically couple drop filter 510, add port 520, drop port 570 and add filter 580 to diffraction prism 560. In alternative embodiments, diffraction prism 560 is replaced with other components, for example, a mirror. Add filter 580 operates to add a channel to the channels of intermediate port 540. The resulting channels are output to output port 590.

The embodiment of FIG. 5 illustrates an add/drop device implemented with discrete optical components; however, six collimators are used that operate to interconnect the components of FIG. 5. The number of components through which an optical signal passes can be reduced, and performance of the add/drop device thereby improved, by integrating the components of the add/drop device and removing collimators 550.

Figure 6:
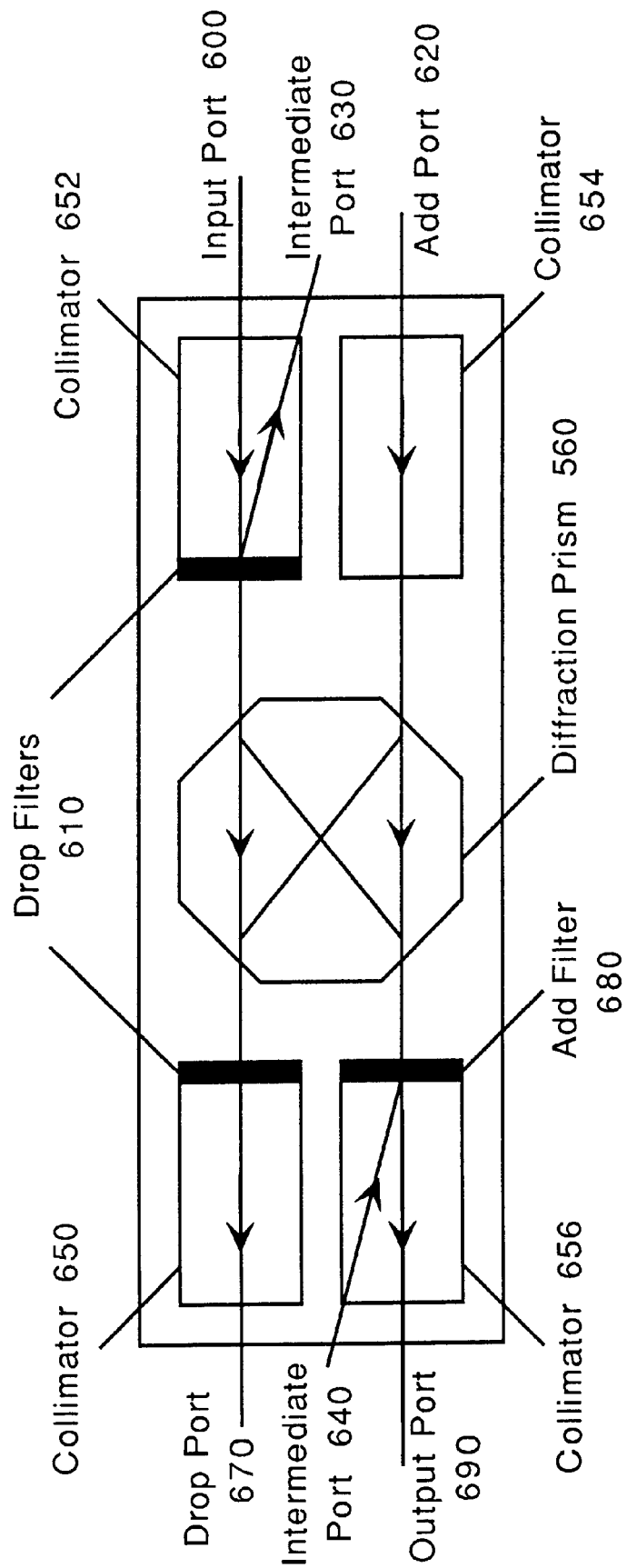
FIG. 6 is one embodiment of an integrated configurable add/drop device having a prism switch according to one embodiment of the invention.

FIG. 6 is one embodiment of an integrated add/drop device having a prism switch according to one embodiment of the invention. The add/drop device illustrated in FIG. 6 has fewer collimators than the add/drop device of FIG. 5. In one embodiment, collimators 652 and 656 are dual-port collimators. Further, collimators 650, 652 and 656 include filters. Alternative embodiments having triple-port and quad-port collimators are described in greater detail below.

Collimator 652 provides input port 600, intermediate port 630 and a filter. The embodiment illustrated by FIG. 6 includes two filters to provide drop filter 610; however, a single filter in collimator 652 or collimator 650 can also be used. Collimator 650 provides drop port 670 and a second filter for drop filters 610. Collimator 654 provides add port 620. Collimator 656 provides intermediate port 640, output port 690 and add filter 680.

Collimators 652 and 654 provide input paths to diffraction prism 560. Collimators 650 and 656 provide output paths from diffraction prism 560. When diffraction prism 560 is physically located between collimators 650, 652, 654 and 656, input port 600 is optically coupled to output port 690 and add port 620 is optically coupled to drop port 670. When diffraction prism 560 is not physically located between collimators 650, 652, 654 and 656, input port 600 is optically coupled to drop port 670 and add port 620 is optically coupled to output port 690.

In one embodiment, diffraction prism 560 is physically moved by a solenoid or by an electric motor. In an alternative embodiment, collimators 650, 652, 654 and 656 can be configured such that diffraction prism 560 is physically placed between collimators 650, 652, 654 and 656, input port 600 is optically coupled to drop port 670 and add port 620 is optically coupled to output port 690. Similarly, when diffraction prism is not located between collimators 650, 652, 654 and 656, input port 600 is optically coupled to output port 690 and add port 620 is optically coupled to drop port 670.

Figure 7:
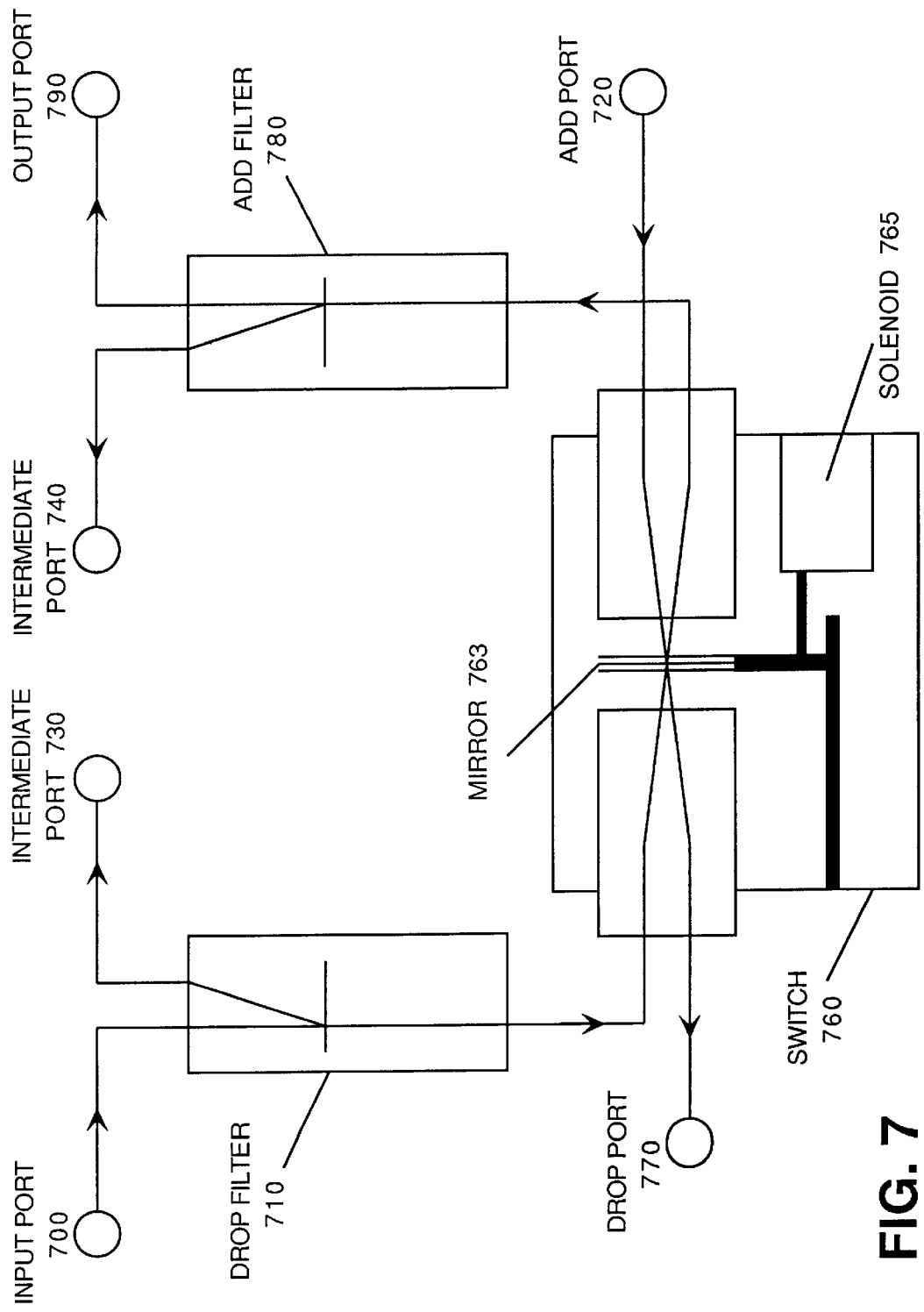
FIG. 7 is a configurable add/drop device having a mirror switch according to the one embodiment of the invention built with discrete optical components.

FIG. 7 is an add/drop device having a mirror switch according to the one embodiment of the invention built with discrete optical components. The add/drop device of FIG. 7 is illustrated with four dual-port collimators; however, other types of collimators can also be used.

Input port 700 is optically coupled to drop filter 710. Drop filter drops one channel that is received via input port 700 and reflects the remaining channels to intermediate port 730. As described in greater detail above, drop filter 710 can include multiple filters. The channel dropped by drop filter 710 is provided to switch 760.

In one embodiment, switch 760 includes mirror 763 and solenoid 765 that moves mirror 763 to selectively optically couple drop filter 710 and add port 720 to drop port 770 and add filter 780. When mirror 763 is physically placed between the collimators of switch 760, the channel dropped by drop filter 710 is reflected by mirror 763 to drop port 770. The channel that is provided to add port 720 is reflected by mirror 763 to add filter 780. Add filter 780 adds the channel received to the channels received by intermediate port 740 to provide an output signal to output port 790.

When mirror 763 is not physically located between the collimators of switch 760, drop filter 710 is optically coupled to add filter 780. Similarly, add port 720 is optically coupled to drop port 770. Thus, when mirror 763 is not placed between the collimators of switch 760, the channel dropped by drop filter 710 is added back by add filter 780 and the device optically coupled to add port 720 and drop port 770 does not have access to any of the channels received at input port 700.

Figure 8:
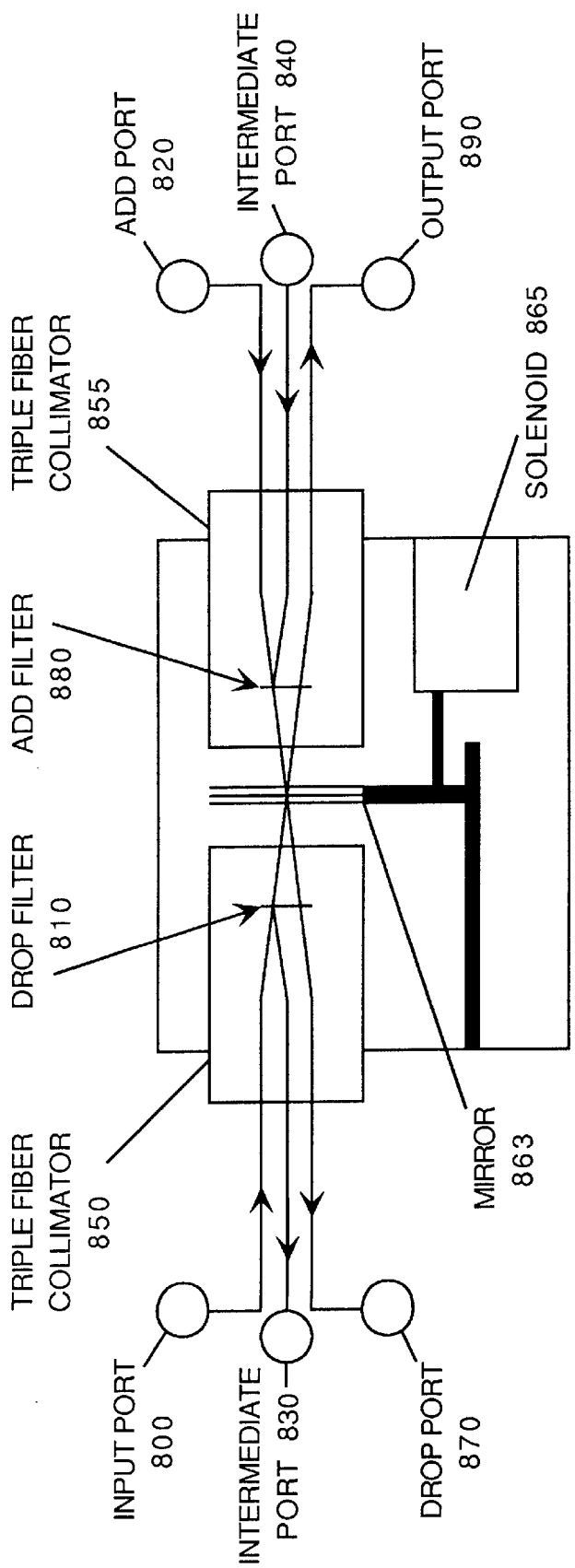
FIG. 8 is an integrated configurable add/drop device having a mirror switch according to one embodiment of the invention.

FIG. 8 is an integrated add/drop device having a mirror switch according to one embodiment of the invention. The integrated add/drop device of FIG. 8 includes fewer collimators than the add/drop device of FIG. 7. In one embodiment, the triple fiber collimators of FIG. 8 are configured as described in greater detail below with respect to FIGS. 10a and 10b.

In one embodiment, triple fiber collimator 850 provides input port 800, intermediate port 830 and drop port 870.

Triple fiber collimator 850 also includes drop filter 810. Alternative configurations can also be used. In one embodiment, triple fiber collimator 855 provides add port 820, intermediate port 840 and output port 890. Triple fiber collimator 855 also includes add filter 880.

In one embodiment, solenoid 865 moves mirror 863 such that mirror 863 reflects signals or allows signals to pass between triple fiber collimators 850 and 855. Drop filter 810 drops a channel received via input port 800 and reflects the remaining channels to intermediate port 830. The channel that is passed by drop filter 810 is reflected to drop port 870 if mirror 863 is between collimators 850 and 855.

If mirror 863 is between collimators 850 and 855, the channel provided by add port 820 is reflected by mirror 863 to add filter 880 and is added to the channels provided by intermediate port 840 and output to output port 890. If mirror is not between collimators 850 and 855, the channel dropped by drop filter 810 is passed to output port 890 and added to channels received via intermediate port 840 by add filter 880 and output to output port 890.

Figure 9:
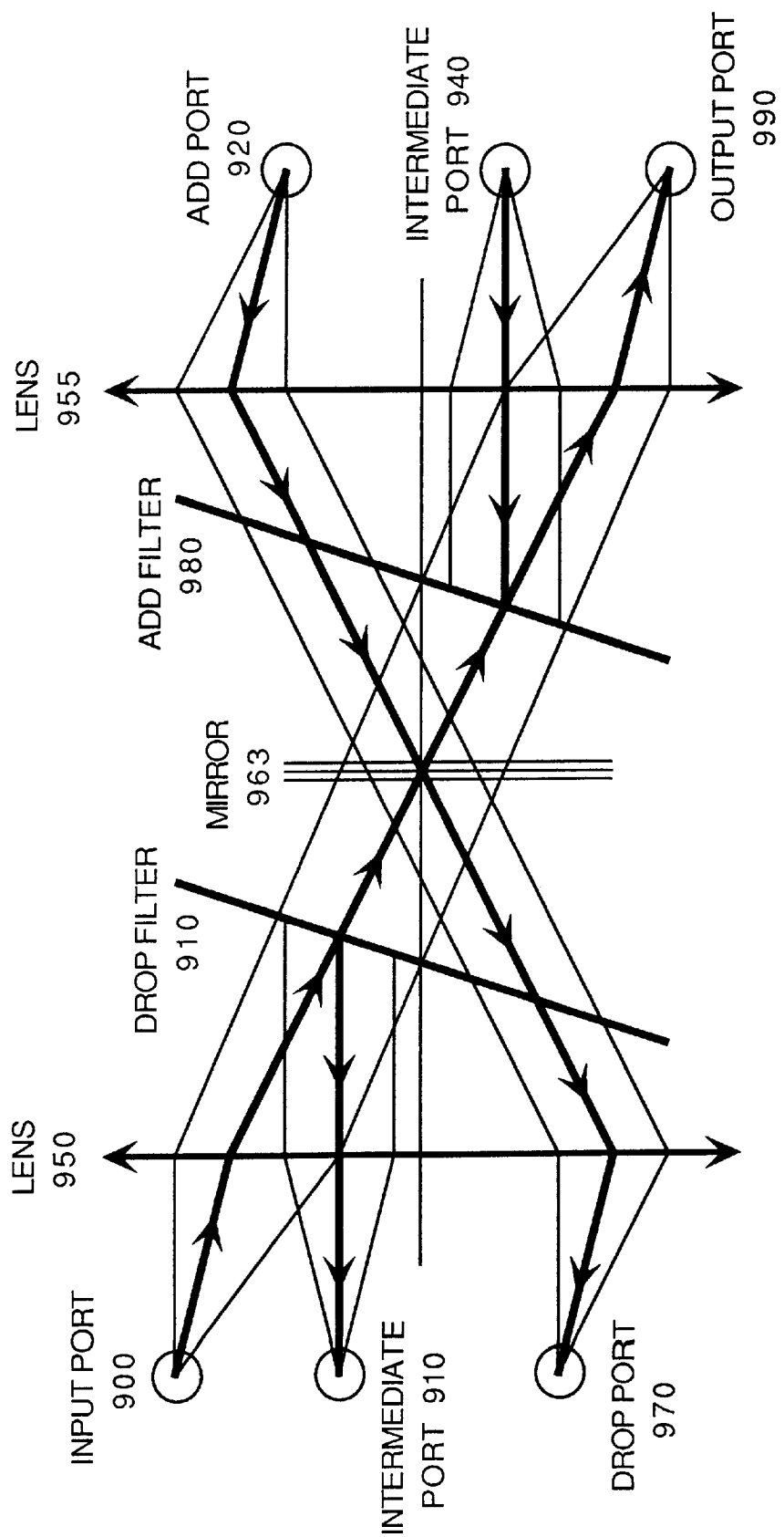
FIG. 9 illustrates the basic optical principles of the integrated add/drop device of FIG. 8.

FIG. 9 illustrates the basic optical principles of the integrated add/drop device of FIG. 8. For the example of FIG. 9, the input collimator that includes input port 900, intermediate port 910 and drop port 970 is configured as described below with respect to FIG. 10a. Similarly, the output collimator that includes add port 920, intermediate port 940 and output port 990 is configured as described below with respect to FIG. 10b. Other collimator configurations can also be used; however, corresponding modifications of the optical operation of FIG. 9 result.

Lens 950 focuses light passing between input port 900, intermediate port 910 and drop port 970 and drop filter 910. Similarly, lens 955 focuses light passing between add port 920, intermediate port 940 and output port 990 and add filter 980. Mirror 963 is a double sided mirror and is movable to allow light to pass or to reflect.

In one embodiment, the distance between the input ports and the distance between the output ports, the distance between the lenses and the ports as well as the lenses and the filters, and the angle of the filters are configured as described below. Other configurations can also be implemented.

Figure 10B:
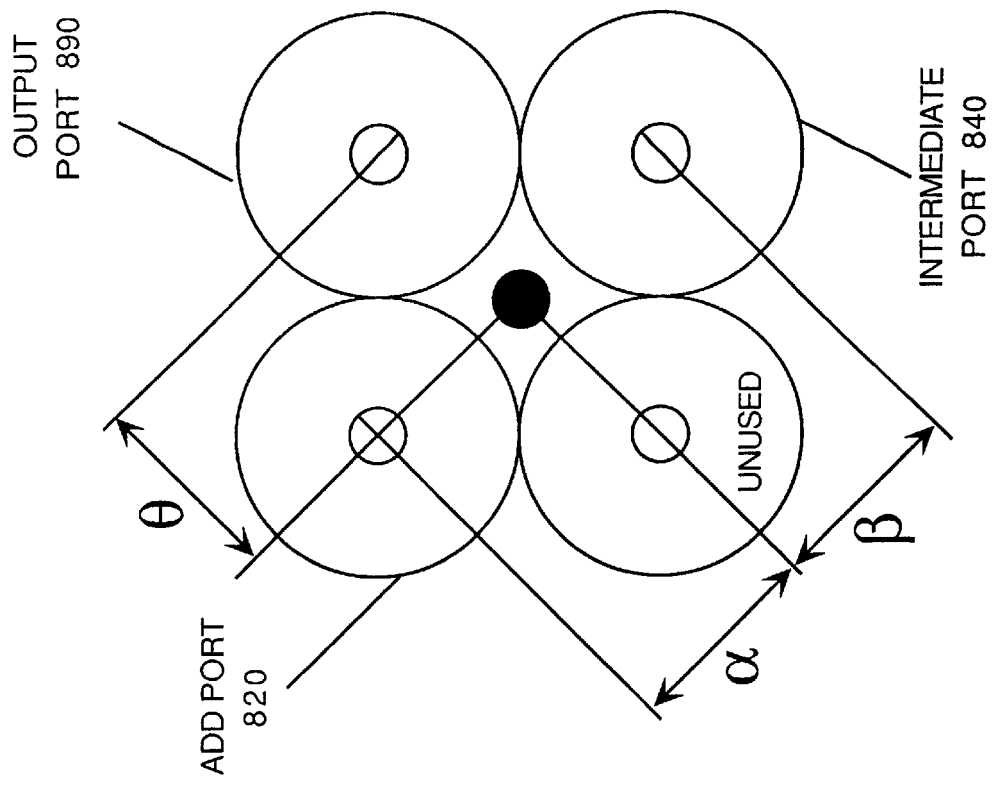
FIG. 10b is an output triple fiber collimator according to one embodiment of the invention.
Figure 10A:
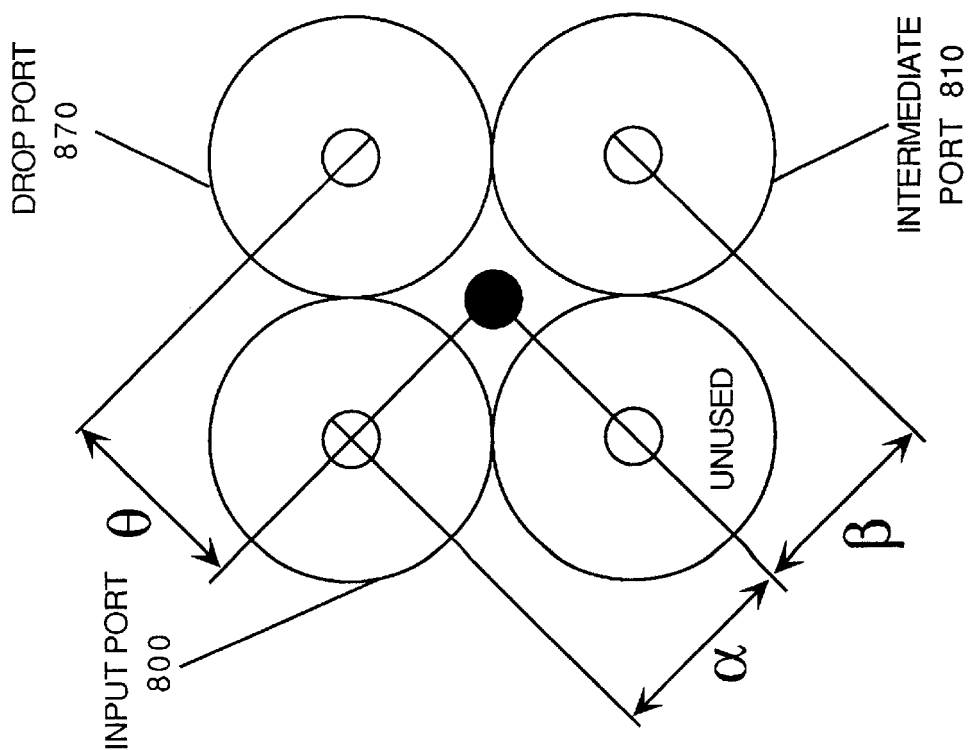
FIG. 10a is an input triple fiber collimator according to one embodiment of the invention.

In embodiments of FIGS. 10a and 10b, r is the fiber radius, f is the lens focus distance, $\alpha$ is the input angle, $\beta$ is the filter reflection angle, and $\theta$ is the mirror reflection angle at the filter. FIG. 10a is an input triple fiber collimator according to one embodiment of the invention. FIG. 10b is an output triple fiber collimator according to one embodiment of the invention. In one embodiment, $\alpha=\beta=\theta\cong 1.4r/f$. Because the filter spectrum shifts with the light incident angle, when light passes through a filter twice, the incident angles should be equal to each other.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An optical add/drop device comprising:
   an input port to receive multiple channels of information;
   a drop filter optically coupled to the input port, for passing a predetermined channel and for reflecting remaining channels to a first intermediate port, connectable to optical processing means;
   an add filter optically coupled to a second intermediate port, connectable to the optical processing means, for adding the predetermined channel and for reflecting the remaining channels to an output port;
   a switch optically coupled to the drop filter, to the add filter, to an add port and to a drop port, the switch to selectively optically couple the drop filter and the add port to the add filter and the drop port;
   whereby the channels not passed by the drop filter which are reflected to the first intermediate port are processable independently of the channel added by the add filter.

2. The apparatus of claim 1 wherein the switch optically couples the drop filter to the drop port and the add port to the add filter when in a first state.

3. The apparatus of claim 1 wherein the switch optically couples the drop filter to the add filter and the add port to the drop port when in a second state.

4. The apparatus of claim 1 wherein the switch comprises an optical beam shifting device.

5. The apparatus of claim 1 wherein the switch comprises an optical beam steering device.

6. An optical add/drop device comprising:
   means for dropping a first channel from an input multi-channel optical path, which is connectable to optical processing means;
   means for adding a second channel to an output multi-channel optical path, which is connectable to the input multi-channel optical path;
   means for selectively optically coupling the means for dropping and a drop port, and for selectively optically coupling the means for dropping and the means for adding;
   whereby channels in the input multi-channel optical path are processable independently of channels in the output multi-channel optical path prior to the channels in input multi-channel optical path being added to the output multi-channel optical path.

7. The apparatus of claim 6 further comprising means for communicating channels of the input multi-channel optical path without the first channel to an intermediate port.

8. The apparatus of claim 6 wherein the means for selectively optically coupling comprises a 2×2 optical switch.

9. A configurable add/drop mechanism comprising:
   a first add/drop device having an input port, an output port, an add port, a drop port, a first intermediate port, and a second intermediate port, the first add/drop device comprising
      a drop filter optically coupled to the input port to pass a first predetermined channel and to reflect remaining channels to the first intermediate port,
      an add filter optically coupled to the second intermediate port to pass the first predetermined channel and to reflect the remaining channels to the output port, and
      a switch optically coupled to the drop filter to receive the first predetermined channel, the switch optically coupled to receive a first signal from the add port and to selectively optically couple the add port and the drop filter to the drop port and the add filter; and
   a second add/drop device having an input port, an output port, an add port, a drop port, a first intermediate port, and a second intermediate port, the second add/drop device comprising
      a drop filter optically coupled to the input port to pass a second predetermined channel and to reflect remaining channels to the first intermediate port, an add filter optically coupled to the second intermediate port to pass the second predetermined channel and to reflect the remaining channels to the output port, and a switch optically coupled to the drop filter to receive the second predetermined channel, the switch optically coupled to receive a first signal from the add port and to selectively optically couple the add port and the drop filter to the drop port and the add filter;

wherein the first intermediate port of the first add/drop device is optically coupled to the input port of the second add/drop device, and the output port of the first add/drop device is optically coupled to the second intermediate port of the second add/drop device;

whereby the remaining channels leaving the first intermediate port of the second add/drop device are processable by independent processing means prior to having the channels, passed by the add filters of the first and second add/drop devices, added thereto.

10. The configurable add/drop mechanism of claim 9 wherein the switch of the first add/drop device comprises a line shifting prism.

11. The configurable add/drop mechanism of claim 9 wherein the switch of the first add/drop device comprises a movable mirror.

12. The configurable add/drop mechanism of claim 9 wherein the switch of the second add/drop device comprises a line shifting prism.

13. The configurable add/drop mechanism of claim 9 wherein the switch of the second add/drop device comprises a movable mirror.

* * * * *